US007890364B2

(12) United States Patent
Piccionelli

(10) Patent No.: US 7,890,364 B2
(45) Date of Patent: Feb. 15, 2011

(54) ELECTRONIC INITIATIVE PETITION

(76) Inventor: Gregory A. Piccionelli, 30801 Calaise Ct., Westlake Village, CA (US) 91362

( * ) Notice: Subject to any disclaimer, the term of this patent is extended or adjusted under 35 U.S.C. 154(b) by 144 days.

(21) Appl. No.: 11/784,218

(22) Filed: Apr. 5, 2007

(65) Prior Publication Data

US 2007/0265909 A1 Nov. 15, 2007

Related U.S. Application Data

(63) Continuation of application No. 10/201,884, filed on Jul. 24, 2002, now abandoned.

(60) Provisional application No. 60/308,011, filed on Jul. 26, 2001.

(51) Int. Cl.
*G06F 11/00* (2006.01)

(52) U.S. Cl. .......................................................... 705/12

(58) Field of Classification Search .................. 705/10, 705/7

See application file for complete search history.

(56) References Cited

U.S. PATENT DOCUMENTS 5,878,399 A * 3/1999 Peralto ........................ 705/12
6,169,789 B1 * 1/2001 Rao et al. .............. 379/110.01
6,219,423 B1 * 4/2001 Davis ......................... 380/268
6,480,587 B1 * 11/2002 Rao et al. .............. 379/110.01
6,882,859 B1 * 4/2005 Rao et al. ................ 455/550.1
7,200,749 B2 * 4/2007 Wheeler et al. ............. 713/170
7,237,717 B1 * 7/2007 Rao et al. ................... 235/386
2001/0034640 A1 * 10/2001 Chaum ........................ 705/12
2001/0037234 A1 * 11/2001 Parmasad et al. ............. 705/12

* cited by examiner

*Primary Examiner*—Romain Jeanty

(57) ABSTRACT

Preferred embodiments of the instant invention are directed to a system, method and apparatus for providing an efficient means for qualifying a petition, referendum or initiative on a ballot on a network. Users on the network access the petition qualifying system via a user interface and requests petitions or initiatives in the user's relevant voting area. After the user has reviewed the petition, the user can endorse the petition by providing the petition qualifying system endorsement indicia. The petition qualifying system verifies the eligibility of the user. The petition qualifying system compiles the received endorsement indicia, and presents such indicia to the relevant agency to secure placement of the initiative on the appropriate ballot.

23 Claims, 3 Drawing Sheets

ELECTRONIC INITIATIVE PETITION

This application is a continuation of U.S. patent application Ser. No. 10/201,884, filed Jul. 24, 2002, now abandoned which in turn was based on U.S. Provisional Patent Application Ser. No. 60/308,011, filed Jul. 26, 2001, the entire disclosures of each of which are incorporated herein by reference.

FIELD OF THE INVENTION

The present invention relates to a computer-based method for qualifying an initiative for placement on a ballot. More particularly, the present invention relates to a computer-based method by which registered voters can electronically sign a petition for a ballot initiative.

BACKGROUND OF THE INVENTION

Presently, when backers of a ballot initiative seek to qualify the initiative, they must obtain a prescribed minimum number of valid signatures from registered voters within the appropriate jurisdiction (e.g., state, county, city, etc.). Typically, these signatures must be obtained by personally convincing voters to physically sign petitions for placement of the initiative on a ballot as prescribed by law. Proper identification of the voter must be obtained. This signature-gathering process is costly as well as labor-intensive. Further, in current signature gathering efforts, the employee gathering the signatures cannot easily verify the eligibility of the person to vote. As such, duplicate efforts must often be expended as signature counts fall below the required numbers once ineligible signatures are removed from the roster.

A need exists for a method for obtaining signatures to qualify an initiative, referendum or other form of petition that reduces the required expenditure of time and labor. A further need exists for immediately ascertaining whether the user signing a petition is eligible to endorse a petition for placing an initiative, referendum or other matter on a ballot.

A still further need exists for a method for obtaining a user's opinion in circumstances where a signature or other validation of a user's identity to authenticate the opinion reduces the required expenditure of time and labor involved in obtaining such authenticated opinions.

BRIEF DESCRIPTION OF THE DRAWINGS

The invention may be more readily understood by referring to the accompanying drawings in which.

SUMMARY OF THE DISCLOSURE

Figure 1:
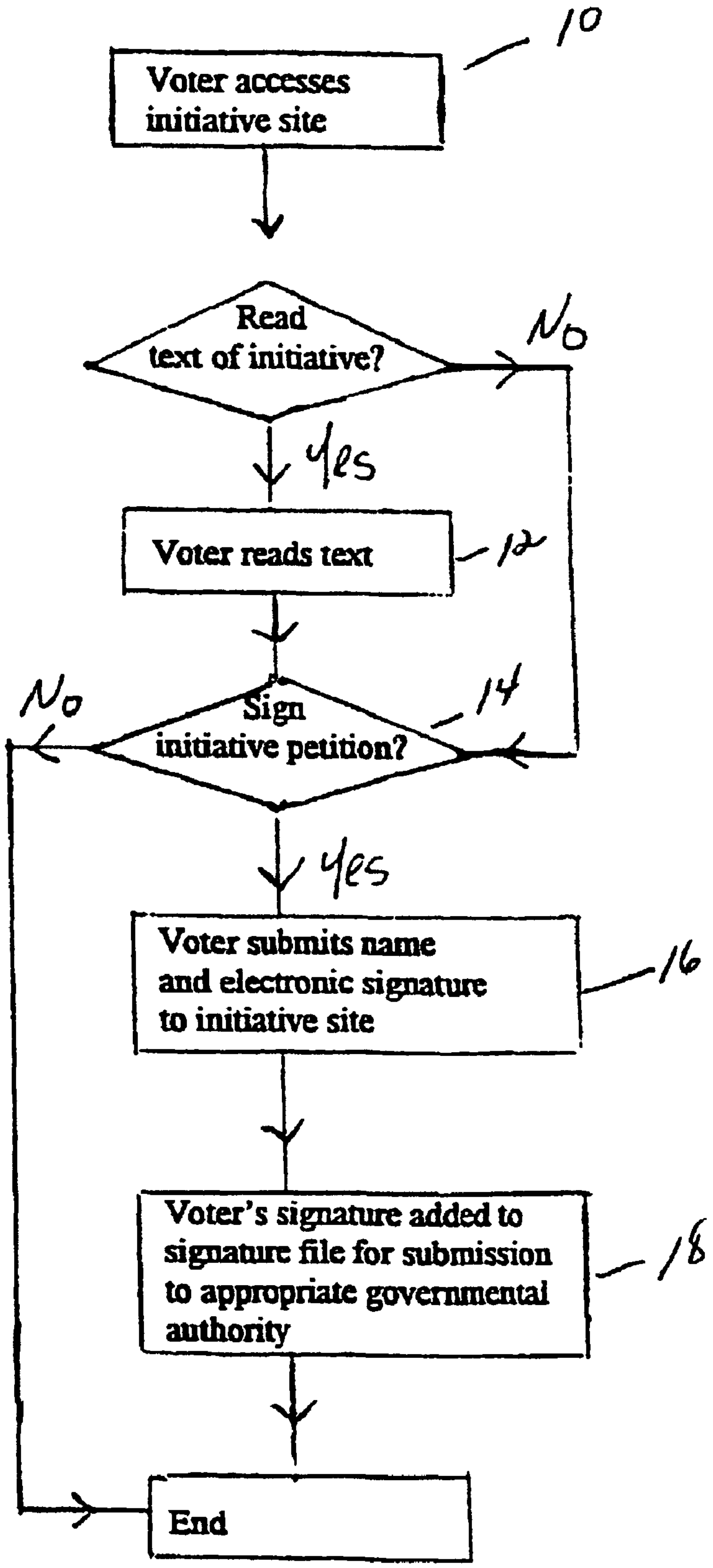
FIG. 1 is a flow diagram illustrating the operation of an embodiment of the invention.

Preferred embodiments of the instant invention are directed to a system, method and apparatus for providing an efficient means for qualifying a petition, referendum or initiative on a ballot. In preferred embodiments, petitions are presented to the system by lobbying groups, organizations, and in some instances, users. Petitions are stored in association with relevant voting areas.

In preferred embodiments, users on the network access the petition qualifying system via a user interface, such as a web page. Overall, a user accesses the petition qualifying system and requests petitions or initiatives in the user's relevant voting area. After the user has reviewed the petition, the user can endorse the petition by providing the petition qualifying system endorsement indicia, such as, a digital signature. In some preferred embodiments, the system compares relevant user information, or the digital signature, with previously stored information, and can immediately ascertain the eligibility of the user to vote. The petition qualifying system compiles the received signatures, or other endorsement indicia, and presents such indicia the relevant agency to secure placement of the initiative on the appropriate ballot.

A feature of preferred embodiments of the invention is that petitions for a given area can be stored in a single location. An advantage to this feature is that users can access all the petitions in the user's relevant voting area such that the user can efficiently review the desired petitions.

A further feature of preferred embodiments is that the system compares the user endorsement information with previously stored information to determine eligibility of the user to vote. An advantage to this feature is that a more accurate count of the required number of 'signatures' to qualify the petition can be ascertained, thereby eliminating the requirement to recollect signatures due to ineligible signatures The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques

DETAILED DESCRIPTION OF THE PREFERRED EMBODIMENTS

Preferred embodiments of the instant invention operate on a network, such as, for example, the WWW, or another type of remote access system, such as, a kiosk, telephone, facsimile, personal digital assistant, pulse code system, web TV, or any other device or method the communicates alpha numeric data with a server.

Hardware Environment

Preferred embodiments of the instant invention operate in accordance with a plurality of networked computers, such as, for example, a user computer and a server computer which are coupled together on a communications network, such as, for example, the Internet or a wide area network. In preferred embodiments, the network system includes a server computer, or a provider computer, and a user computer, wherein the server computer and the user computer are in electronic communication with each other via a communication link.

In some preferred embodiments, the network system includes a plurality of either the server, the user computer, or any combination thereof The server contains petition, referendum or initiative information and other relevant data that is accessible by the user computer. In some preferred embodiments, the server computer also contains other information, including, but not limited to, data regarding the geophysical boundaries of the relevant jurisdiction pertaining to the petition, rules pertaining to the petitioning process, such as acceptable means of endorsing a petition, one or more databases of registered voters, advertisements, and/or the server can access other third party servers containing this and/or other information, programs, etc.

The provider computer, or server, may comprise any suitable network device capable of providing content (data representing text, hypertext, photographs, graphics video and/or audio) for communication over the network. In preferred embodiments, the provider computer comprises a programmable processor capable of operating in accordance with programs stored on one or more computer readable media (for example, but not limited to, floppy disks, hard disks, random access memory RAM, CD-ROM), to provide content for communication to a user computer. The provider computer may comprise, for example, but not limited to, a personal computer, a mainframe computer, network computer, portable computer, personal digital assistant (such as, a 3Com Palm Pilot), a cellular telephone-based computer, an implanted computer, a molecular computer, biological computer, and similar devices. The provider computer may include one or more internal data storage devices (not shown) for storing content for communication to a user computer. Alternatively, or in addition, the provider computer may be coupled to an external data storage device, computer or other means from which the provider computer may obtain content for communication to a user computer. The provider computer is controlled by suitable software to provide the requested content to the requesting user computer in accordance with protocol procedures commonly utilized and understood in the art.

The user computer may comprise any suitable network device capable of communicating with other network devices in the network system. In preferred embodiments, the user computer comprises a programmable processor capable of operating in accordance with programs stored on one or more computer readable media (for example, but not limited to floppy disc, hard disc, computer network, random access memory (RAM), CD-ROM, DVD-ROM, SmartMedia®, molecular data storage means and the like); a display device for providing a user-perceivable display (for example, but not limited to visual displays, such as cathode ray tube CRT displays, light-emitting-diode LED or liquid-crystal-diode LCD displays, plasma, displays or the like, audio displays or tactile displays), and a user input device (for example, but not limited to, a keyboard, mouse, microphone, neuronal interface, or the like). In one preferred embodiment, the user computer comprises a personal computer system having a CRT display, a keyboard and a mouse user-input device.

The user computer is controlled by suitable software, including network communication and browser software to allow a user to request, receive and display information (or content) from or through a provider computer on the network system. The user computers operate in accordance with programs stored on a readable medium, including, but not limited to, floppy disks, hard disks, RAM, CD-ROM, DVD-ROM, SmartMedia®, molecular-based media, and the like. The user computers are any means capable of communicating with the server computers, including, but not limited, to personal computers, telephones, kiosks, ATM-type machines, personal digital assistants, molecular computers and biological computers. The user computers access the server computers via the wide area network or through some other remote access, such as, for example, by telephone, facsimile, personal digital assistant, pulse code system, interactive television, or any other device or method that communicates alpha numeric data with a server.

General Description of Preferred Embodiments

Preferred embodiments of the instant invention are directed to a system, method and apparatus for providing an efficient means for qualifying a petition, referendum or initiative on a ballot, wherein qualification of the petition occurs via a network. It to be understood that preferred embodiments of the qualifying system and methods described herein are not limited to public initiatives and referenda, and can apply to any type of petition, legislation, ballot, poll, survey or other form of public or private opinion collection.

Petitions are presented to the qualifying system by lobbying groups, organizations, and in some instances, users. In preferred embodiments, users on the network can access the petition qualifying system via a user interface, such as a web page. Overall, a user accesses the petition qualifying system and requests petitions or initiatives in the user's relevant voting area. After the user has reviewed the petition, the user can endorse the petition by providing the petition qualifying system endorsement indicia, such as, a digital signature. The petition qualifying system compiles the received signatures, or other endorsement indicia, and presents such indicia the relevant agency to secure placement of the initiative on the appropriate ballot.

With reference to FIG. 1, a user, or voter, is initially directed (by, e.g., a commercial, a petition worker, an advertisement, etc.) to a site maintained by an organization or organizations promoting the ballot initiative, for example a site on a wide-area network such as the World Wide Web or the Internet. Once the voter accesses the initiative site 10, he or she is afforded the opportunity to read the text of the proposed initiative, for example via a menu. The voter then reads the text of the petition or initiative 12, or alternatively proceeds directly to the next step.

At the next step, the voter is afforded the opportunity to add his or her signature, endorsement, attestation, acknowledgment or other form of approval to a petition to place the proposed initiative on the appropriate ballot as prescribed by the election law of the jurisdiction within which the proposed initiative is to be submitted to voters 14. If the voter elects to do so, the voter then submits his or her signature in electronic form, using any conventional means, such as an electronic signature pad, a previously prepared file containing his or her electronic signature, or any other digital transmittable means which is recognized by the relevant jurisdiction to impart legally acceptable endorsement of the petition 16. Once submitted to the initiative site, the voter's signature is then added to a signature file 18. The signature file, containing the signatures of one or more voters, is then submitted to the appropriate governmental authority, preferably together with data files or hard copies of the petition and the text of the proposed initiative. It is to be understood that the use of term "voter" in the described embodiments of the qualifying system is not intended to limit the type of opinion giving user of the invention in any manner and can refer to any type of user of the described system.

In some preferred embodiments, the voter is directed to the initiative via a web site banner advertisement or any Internet browser, user computer or server mediated method, or combination thereof, by which an Internet or other wide area computer network user's computer is directed to a web site or other interface which allows the user to gain access to the initiative site.

In other preferred embodiments, the voter's physical location and/or address, such as address used for voter registration purposes, is determined prior to forwarding an initiative to the voter. In still other preferred embodiments, the location and/ or address may be determined by requesting location and/or address information from the voter which is then inputted by the voter and transmitted to one or more computers for further processing. In some preferred embodiments, the inputting of location and/or address data may be verified by digital signature means or verification by a third party, such as a live notary public or a notary public accessible online. In other preferred embodiments, the voter's location and/or address is determined by querying the user's computer for location and/or address information based on data calculated from signal information, such as that provided by the Global Positioning System ("GPS"), from cellular telephone location information, from location data correlated to the user's Internet Service Provider's ("ISP's") number, from the voter's location or address information stored in the voter's computer or one or more other computers, such as those containing voter registration data and/or any other methods of location determination such as those described in U.S. Pat. No. 6,154,172 and related patents.

In some preferred embodiments, the specific initiative or referendum advertisement or advertisements, or site or sites relating thereto, or initiative or referendum text, to which the voter is directed is determined on the basis of the voter's location or address, thereby initiating a process which will provide the voter with initiatives, referenda and other data which is relevant to the voter in the voter's jurisdiction. In some preferred embodiments, the process by which the differential data is presented to the voter, based upon the voter's location and/or address, may be any means such as, for example, those set forth in U.S. Pat. No. 6,154,172 and related patents.

Figure 2:
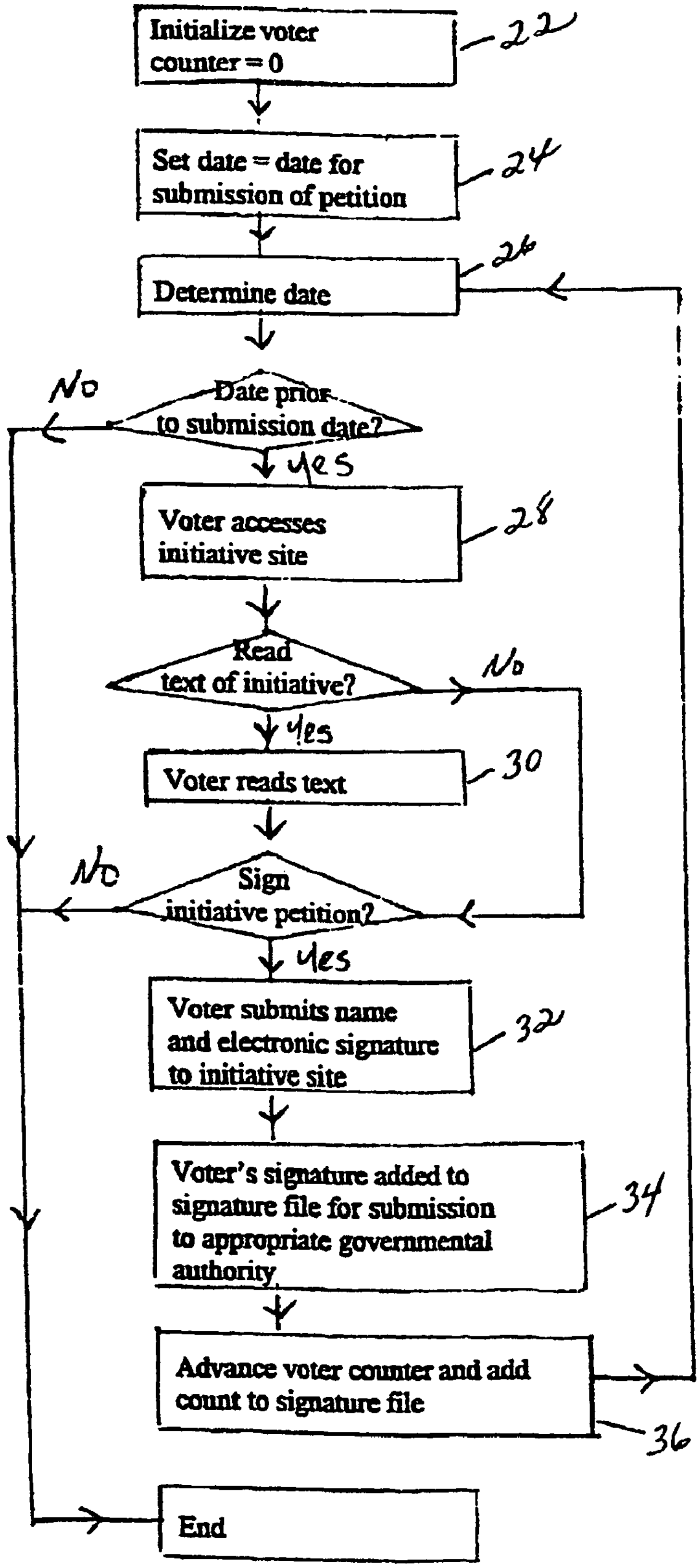
FIG. 2 is a flow diagram illustrating the operation of a more specific embodiment of the invention in which the number of voter signatures is tracked.

A more particular embodiment of the inventive method, as illustrated in FIG. 2, includes an internal calendar and means for determining whether time remains within a statutory period for obtaining signatures for the petition to place the proposed initiative on the ballot, as well as tracking means for counting the number of signatures obtained. First, a voter counter is initialized to zero prior to activation of the initiative site 22. An index is also set to the specific cut-off date 24, and preferably also time (for example, June 1, 11:59 p.m.), after which no more petition signatures may be obtained, as prescribed by the election law of the jurisdiction within which the proposed initiative is to be submitted to voters. The present date is next determined 26. If the present date is prior to the cut-off date/time, then the process proceeds; if the present date is later than the cut-off date/time, the process ends.

A voter then accesses the initiative site 28 and is afforded the opportunity to read or listen to an audio version of the text of the proposed initiative 30 and provide an electronic petition signature 32, in a manner similar to that described with respect to the preceding embodiment. After the voter provides his or her electronic signature, the voter's signature is added to the signature file 34. The voter counter is advanced and the new count is provided to the signature file for submission to an appropriate governmental and/or other recipient 36. This facilitates the determination of the total number of signatures obtained from all sources in support of the proposed initiative, whether electronic or physical signatures.

It should here be noted that any of the foregoing features can be included independently in an embodiment of the inventive method.

Figure 3:
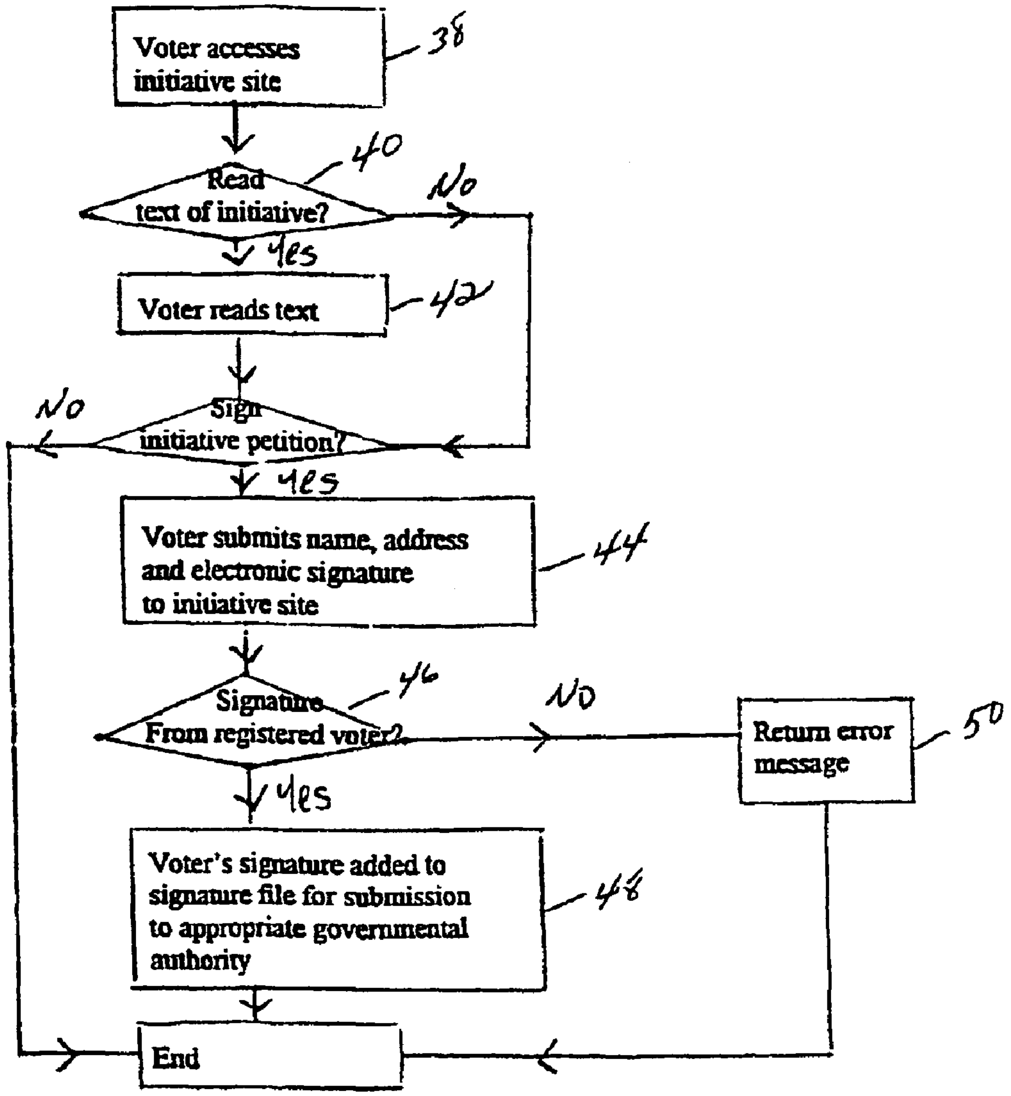
FIG. 3 is a flow diagram illustrating the operation of another more specific embodiment of the invention in which the validity of the voter's signature is verified prior to acceptance.

FIG. 3 illustrates another more specific embodiment which allows for determination of the validity of a signature prior to submission, and for exclusion of invalid signatures, i.e., signatures of persons not registered to vote within the jurisdiction within which the proposed initiative is to be submitted to voters. As with the preceding embodiments, a voter accesses the initiative site 38 and is afforded the opportunity to read the text of the proposed initiative 40, 42 and to submit an electronic signature in support of a petition to place the initiative on the ballot. At this point, the voter submits identifying information, e.g., the voter's name, address, driver's license number, Social Security number and/or other indicia, together with the electronic signature 44. The submitted identifying information is then compared with an appropriate database containing information on the voters who are currently registered to vote within the jurisdiction of interest or otherwise be eligible to endorse the petition, referendum, etc. 46. In some preferred embodiments, voter location and/or address information is inputted and confirmed via comparison to data in one or more databases, such as voter registration records, driver license databases, social security information databases, credit history databases or one or more databases specially configured for such or similar confirmation purposes. Next, the voter's eligibility or ineligibility to endorse the petition or referendum, etc., is determined. In some preferred embodiments, the voter's eligibility to endorse the petition is determined by applying an appropriate set of rules to relevant data obtained regarding the voter, such as the voter's voting registration status. For example, in some preferred embodiments, once there has been a determination that the voter is currently a registered voter within the jurisdiction, then his or her signature is added to the signature file 48. If the voter is determined not to be currently registered within the jurisdiction, then the voter's signature is not added to the signature file and an error message is returned 50. At this point the voter can be advised, for example, to consult the registrar of voters or other appropriate governmental authority in order to change his or her registration status.

In some preferred embodiments, the voter's identification is verified by biometric means transmittable over a wide area network wherein such biometric data regarding the voter has been previously collected by or registered with the provider of the initiative or referendum, a third party that maintains one or more databases of such information, such as a state department of motor vehicles, one or more police entities, such as the Federal Bureau of Investigation, or one or more medical database keepers. Such biometric means include, but are not limited to, eye scanning, voice print identification, finger print analysis, dna analysis, and combinations thereof. In some preferred embodiments, once the biometric data has been collected from the voter, such biometric data is compared with said previously collected or registered biometric data regarding the voter to determine if such data matches. In some preferred embodiments, the degree of matching of such data may be varied to provide varying degrees of probable likelihood that the voter is who the voter represents himself or herself to be.

While the invention has been particularly shown and described with reference to a preferred embodiment thereof, it will be understood by those skilled in the art that various other changes in the form and details may be made therein without departing from the spirit and scope of the invention. For example, in some preferred embodiments, in lieu of or in addition to providing the voter with the text of the initiative or referendum, the voter is provided with an audio version of the text. In other preferred embodiments the system will accept initiatives and referenda from users where the petitioner user types in or uploads text or other materials comprising the petition, initiative or referendum to a website computer or other computer for the purpose of making the petition, initiative or referendum available to qualified voters or other users online. In some preferred embodiments the user desiring to implement the subject system to make an initiative or referendum available to voters or other potential signatories can put restrictions on the presentation of the initiative or referendum, including, without limitation, restrictions regarding location of the voter, location of transmission source of the text, other voter demography, such as party affiliation, age, gender, etc., and legal voting status.

What is claimed is:

1. A system for collecting user signatures for an initiative or referendum on a computer network having a provider computer and a user computer, the initiative or referendum being provided by a third party to a provider computer, wherein the provider computer includes a user interface, the system comprising:

means to access a user registrar database, wherein the user registrar database contains information regarding a user pertaining to the user's eligibility to endorse the initiative or referendum;

an interface for presenting the initiative or referendum to the user computer, the interface being configured to receive user identification information and to present a text of the initiative or referendum to a user;

means for receiving a digital signature of a user to approve the initiative or referendum;

means for operating the provider computer to compare the user identification information with the user registrar database to determine the user's eligibility to vote;

means for compiling a digital signature file comprising digital signatures of users approving the initiative or referendum; and means for transmitting the digital signature file;

wherein the means for operating the provider computer to compare the user's identification information with the user registrar database to determine the user's eligibility to vote comprises Global Position System (GPS) location determination means that determines the user's location based on GPS signals and means to determine whether the user's location based on GPS signals is an eligible user location.

2. A system as claimed in claim 1, further comprising means for notifying the user of ineligibility.

3. A system as claimed in claim 1, further comprising a counter for determining the number of user digital signatures received.

4. A system as claimed in claim 1, wherein the means for compiling a digital signature file comprising digital signatures of users approving the initiative or referendum compiles the digital signature file by adding each digital signature of a user approving the initiative or referendum subsequent to presentation of the text of the initiative or referendum to the user.

5. A method for collecting user signatures for an initiative or referendum on a computer network having a provider computer and a user computer, the initiative or referendum being provided by a third party to the provider computer, wherein the provider computer includes a user interface, the method comprising:

receiving, from the user computer, a request for the transmission of a text of the initiative or referendum;

presenting the text of the initiative or referendum, via a user interface, to the user computer for display to a user;

receiving, from the user computer, via the user interface, user identifying information;

receiving, from the user computer, a user digital signature, wherein the user digital signature signifies an approval of the initiative or referendum;

accessing a user registrar database that contains information pertaining to users' eligibility to endorse the initiative or referendum;

comparing the user identification information with the user registrar database and confirming the eligibility of the user providing the user digital signature;

adding the user digital signature to a digital signature file; and submitting the digital signature file to a receiving agent for compiling a digital signature file comprising digital signatures of users approving the initiative or referendum;

wherein confirming the eligibility of the user providing the user digital signature comprises determining the user's location using Global Positioning System location determination means and determining whether the user's location corresponds to an eligible user location.

6. A method as claimed in claim 5, further comprising transmitting notification to the user computer that the user digital signature does not represent an eligible user.

7. A method as claimed in claim 5, further comprising increasing a count of the number of user digital signatures upon the addition of the user digital signature to the digital signature file and providing the count to the receiving agent.

8. A method as claimed in claim 7 further comprising setting an index to a specific cut-off time after which no more user digital signatures are obtained, wherein the digital signature file and the count are submitted to the receiving agent when the present time is determined to be the cut-off time.

9. A method as claimed in claim 5 further comprising setting an index to a specific cut-off time after which no more user digital signatures are obtained.

10. A method as claimed in claim 9 further comprising determining the present time, wherein the digital signature file is submitted to the receiving agent when the present time is determined to be the cut-off time.

11. A method for collecting user signatures for an initiative or referendum, the initiative or referendum to be submitted to voters in a jurisdiction, on a computer network having a provider computer and a user computer, the initiative or referendum being provided by a third party to the provider computer, wherein the provider computer includes a user interface, the method comprising:

receiving, from the user computer, a request for the transmission of a text of the initiative or referendum;

presenting the text of the initiative or referendum, via a user interface, to the user computer for display to a user;

receiving, from the user computer, via the user interface, user identifying information;

receiving, from the user computer, a user digital signature, wherein the digital signature signifies an approval of the initiative or referendum;

accessing a user registrar database that contains information pertaining to users' eligibility to endorse the initiative or referendum;

comparing the user identification information with the user registrar database and confirming the eligibility of the user providing the user digital signature;

adding the user's digital signature to a digital signature file; and submitting the digital signature file together with a copy of the initiative or referendum to a governmental authority in the jurisdiction in which the initiative or referendum is to be submitted to voters;

wherein confirming the eligibility of the user providing the user digital signature comprises determining the user's location using Global Positioning System location determination means and determining whether the user's location corresponds to an eligible user location.

12. A method as claimed in claim 11, further comprising transmitting notification to the user computer that the user signature does not represent an eligible user.

13. A method as claimed in claim 11, further comprising increasing a count of the number of signatures upon the addition of the user digital signature to the digital signature file and providing the count to the governmental authority.

14. A method as claimed in claim 13 further comprising setting an index to a specific cut-off time after which no more user digital signatures are obtained, wherein the digital signature file and the count are submitted to the appropriate governmental authority when the present time is determined to be the cut-off time.

15. A method as claimed in claim 11 further comprising setting an index to a specific cut-off time after which no more user digital signatures are obtained.

16. A method as claimed in claim 15 further comprising determining the present time, wherein the digital signature file is submitted to the governmental authority when the present time is determined to be the cut-off time.

17. A process for collecting user signatures for an initiative or referendum on a computer network, the process comprising:

storing in an electronic database information received from third parties regarding initiatives, petitions or referenda from third parties;

connecting a provider computer system for communication on the computer network;

providing a user interface to selectively provide a plurality of user computers on the computer network with access to information relating to the initiatives, petitions or referenda, and to receive user input; and configuring the provider computer to:

determine a physical location of each of the users' computers based on a Global Positioning System location determining device associated with each of the users' computers;

determine specific initiatives, petitions or referenda that correspond to the physical location of each users' computer;

provide each users' computer with access to specific initiatives, petitions or referenda determined to correspond to the physical location of that users' computer;

receive votes or signatures corresponding to the specific initiatives, petitions or referenda as user input from users' computer; and update a counter associated with each specific initiatives, petitions or referenda in response to the receipt of a vote or signature corresponding to the specific initiative, petition or referendum.

18. A system for collecting user signatures for an initiative or referendum on a computer network, the system comprising:

electronic storage that stores information received from third parties regarding initiatives, petitions or referenda from third parties;

a provider computer system operatively connected for communication on the computer network and having at least one processor configured to provide a user interface to a plurality of user computers on the computer network, for providing users with selective access to information relating to the initiatives, petitions or referenda and for receiving user input;

the at least one processor of the provider computer system further configured to:

determine a physical location of each of the users' computers based on a Global Positioning System location determining device associated with each of the users' computers;

determine specific initiatives, petitions or referenda that correspond to the physical location of each users' computer;

provide each users' computer with access to specific initiatives, petitions or referenda determined to correspond to the physical location of that users' computer;

receive votes or signatures corresponding to the specific initiatives, petitions or referenda as user input from users' computer; and update a counter associated with each specific initiatives, petitions or referenda in response to the receipt of a vote or signature corresponding to the specific initiative, petition or referendum.

19. A system as recited in claim 18, wherein the computer network comprises the Internet and the user interface comprises an Internet website accessible to users on the Internet.

20. A system as recited in claim 18, wherein the at least one processor of the provider computer system being configured to receive said votes or signatures through the user interface.

21. A system as recited in claim 18, wherein the at least one processor of the provider computer being configured to determine the physical location of a user's computer by sending a query to the user's computer for location information.

22. A system as recited in claim 21, wherein the at least one processor of the provider computer being configured to receive location information from a user's computer after sending a query to the user's computer for location information.

23. A system as recited in claim 22, wherein the location information comprises information corresponding to a GPS signal processed by the user's computer.

* * * * *